United States Patent [19]

Shirahata et al.

[11] 3,929,604

[45] Dec. 30, 1975

[54] METHOD FOR PRODUCING MAGNETIC RECORDING MEDIUM

[75] Inventors: Ryuji Shirahata; Tatsuji Kitamoto; Mahito Shimizu, all of Kanagawa; Akira Tasaki, Osaka; Masaaki Suzuki, Kanagawa, all of Japan

[73] Assignee: Fuji Photo Film Co., Ltd., Minami-ashigara, Japan

[22] Filed: July 25, 1974

[21] Appl. No.: 491,901

[30] Foreign Application Priority Data

July 25, 1973 Japan ................................ 48-83836

[52] U.S. Cl. .................. 204/192; 204/298; 427/39; 427/48; 427/128; 427/132; 340/174 TF

[51] Int. Cl.² ...................... C23C 15/00; B05D 3/14

[58] Field of Search ........... 117/93.1 CD, 6 D, 93.2, 117/238; 204/192, 298; 250/530; 427/38, 39, 48, 128, 132

[56] References Cited

UNITED STATES PATENTS

| | | | |
|---|---|---|---|
| 3,282,815 | 11/1966 | Kay et al. | 204/192 |
| 3,282,816 | 11/1966 | Kay | 204/192 |
| 3,306,116 | 2/1967 | Maissel et al. | 204/192 |
| 3,329,601 | 7/1967 | Mattox | 204/298 |
| 3,413,141 | 11/1968 | Friedman | 117/93.2 |
| 3,533,836 | 10/1970 | Massengale et al. | 117/237 |
| 3,616,404 | 10/1971 | Gregory | 204/192 |

*Primary Examiner*—John H. Mack
*Assistant Examiner*—Aaron Weisstuch
*Attorney, Agent, or Firm*—Sughrue, Rothwell, Mion, Zinn & Macpeak

[57] ABSTRACT

A method for producing a magnetic recording medium by ionic-plating having generally uniform magnetic characteristics in every direction comprising generating in a vacuum chamber and in a magnetic field a plasma of the glow discharge of a gas between a negatively-charged magnetic recording medium substrate and a positively-charged evaporative source of a ferromagnetic material and positioning the substrate in a magnetically concentrated zone of the plasma which is concentrated by the magnetic field, whereby the ferromagnetic material is evaporated and deposited on the magnetic recording medium substrate.

10 Claims, No Drawings

METHOD FOR PRODUCING MAGNETIC RECORDING MEDIUM

BACKGROUND OF THE INVENTION

1. FIELD OF THE INVENTION

This invention relates to a method for producing a magnetic recording medium by ionic-plating, and, more precisely, to a method for producing a magnetic recording medium having excellent magnetic characteristics, especially a high squareness ratio, by ionic-plating.

2. DESCRIPTION OF THE PRIOR ART

Ferromagnetic thin metal films formed on a substrate by electroplating, non-electrolytic plating, sputtering, vacuum evaporation, ionic-plating or the like have recently become worthy of notice as the so-called non-binder type magnetic recording media in which no binder is used, in place of conventional binder-type magnetic recording media produced by coating a dispersion of magnetic powders of $\gamma$—$Fe_2O_3$, Co-doped $\gamma$—$Fe_2O_3$, $Fe_3O_4$, $CrO_2$ or ferromagnetic alloys in an organic binder on a substrate. As one of the essential requisites for magnetic recording media used for high density recording, it is proposed, either theoretically or experimentally, to impart a high coercive force thereto and to reduce the thickness of the magnetic film thereof, and improvements in non-binder type magnetic recording media which can more easily be reduced in thickness by a factor of 10 than other coated-type magnetic recording media and which have a higher magnetic flux saturation are desired and various efforts have heretofore been made for the practical use of such advantageous non-binder type magnetic recording media.

A method of evaporation plating in a glow discharge or a so-called ionic-plating method as disclosed in U.S. Pat. No. 3,329,601 is one located in the intermediate position between the preparation of alloy particles by low-vacuum evaporation and vacuum evaporation plating, and this method has the possibility that a magnetic thin film having sufficient coercive force and squareness ratio suitable for magnetic recording medium can be formed, and so, this method is an interesting method. In addition, according to this method, evaporated metal is ionized in the glow discharge field and accelerated by an electric field for adherence on a substrate, and thus, adhesion of the evaporated metal on the substrate is far stronger than the adhesion obtained using other conventional vacuum evaporation plating methods. Accordingly, the magnetic recording medium produced by this method is suitable for use as a magnetic recording medium which is subjected to severe conditions under relative movement with a magnetic head. However, according to the conventional ionic-plating method as described in this U.S. Pat. No. 3,329,601, although improvement of the coercive force can be achieved due to the pressure of argon gas during the glow discharge, it is difficult or rather impossible to obtain the high squareness ratio necessary for a magnetic recording medium.

SUMMARY OF THE INVENTION

An object of this invention is to provide an ionic-plating method for producing a magnetic recording medium, which has markedly improved magnetic characteristics, particularly a high squareness ratio, and good surface characteristics.

More precisely, this invention provides a method for producing an improved magnetic recording medium by ionic-plating comprising generating in a vacuum chamber and in a magnetic field a plasma of the glow discharge of gas between a negatively-charged magnetic recording medium substrate and a positively-charged evaporative source of a ferromagnetic material and positioning the substrate in a magnetically concentrated zone of the plasma which is concentrated by the magnetic field, whereby the ferromagnetic material is evaporated and deposited on the magnetic recording medium substrate.

DETAILED DESCRIPTION OF THE INVENTION

In formation of magnetic thin films for use in memory elements for electronic computers and the like using vacuum evaporation coating, plating or the like, a method has heretofore been practiced where a magnetic field is applied during the formation thereof to induce a uniaxial magnetic anisotropy in the magnetic thin film. It has now been found quite unexpectedly that, according to the method of the present invention, a magnetic thin film can be obtained which has improved magnetic characteristics with an extremely high squareness ratio in every direction in the surface of the thin film and also has improved surface characteristics, without inducing uniaxial anisotropy in this magnetic thin film. Such phenomena are considered quite novel, being different from those of other conventional methods where uniaxial anisotropy is induced in the magnetic film.

More particularly, it has been found that magnetic thin films of extremely excellent squareness in every direction in the surface thereof can be produced only when the substrate is positioned in the concentrated zone of the plasma generated by the applied magnetic field.

These phenomena in the method of the present invention have not as yet been completely clarified physically and theoretically, and while not desiring to be bound to the following theory, it is believed that in the method of this invention the plasma generated by the glow discharge due to the magnetic field is concentrated in the vicinity of the substrate, whereby an even film having good surface characteristics and microscopic structure is plated thereon by ionic-plating and good magnetic characteristics are imparted to this film.

Representative examples of ferromagnetic substances which can be used in the present invention are, for example, ferromagnetic metals such as iron, cobalt and nickel, magnetic alloys such as Fe—Co, Fe—Ni, Co—Ni, Fe—Rh, Fe—Cu, Fe—Au, Co—Cu, Co—Au, Co—Y, Co—La, Co—Pr, Co—Gd, Co—Sm, Co—Pt, Ni—Cu, Fe—Co—Ni, Mn—Bi, Mn—Sb and Mn—Al, and ferrite-type magnetic substances such as Ba—ferrite and Sr—ferrite.

The thickness of the magnetic thin film formed according to the method of this invention is, in general, in the range of about 0.05 $\mu$m to 1.0 $\mu$m, preferably 0.1 $\mu$m to 0.4 $\mu$m, in view of such essential requisites that the film be sufficiently thick that a sufficient output to the magnetic recording medium can be imparted and the film be sufficiently thin that high density recording can be carried out. The strength of the magnetic field used in the present invention ranges from abut 50 to 5000 oe, practically preferably 100 to 2000 oe, on the surface of the substrate. Suitable temperatures which can be used to heat the evaporation source of the ferromagnetic material range from about 1000 to 1700°C.

Suitable ionic-plating conditions which can be used in the present invention are those as described in the above mentioned U.S. Pat. No. 3,329,601, and the apparatus for the method of this invention can easily be a modification of the apparatus used in the conventional ionic-plating method. More precisely, the degree of vacuum in the apparatus containing an inert gas employed in ionic-plating is, in general, in the range of about 0.001 to 0.1 Torr, preferably 0.005 to 0.05 Torr, and the acceleration voltage potential for the glow discharge is, in general, about 0.1 to 5 kv, preferable 0.2 to 2.0 kv. The time necessary for ionic-plating varies, depending upon the process conditions and the thickness of the magnetic thin film desired, but is, in general, about 0.5 to 20 minutes.

Suitable inert gases which can be used in the present support (width: 2 inches) was wound around the central region of the magnet between the N-pole and S-pole of the magnet, Co, Co—Ni and Co—Cu were plated by ionic-plating analogously to the above process. The strength of the magnetic field at the surface of the support was 1000 oe. The luminosity of the plasma was concentrated in the part of the polyethylene terephthalate support positioned in the central region of the permanent magnet.

In every case, argon was used for glow discharge, and the conditions of the ionic-plating were as follows: degree of vacuum: 0.01 Torr; acceleration voltage: 0.4 kv; time: 6 minutes. The surface of the substrate was not pre-cleaned prior to ionic-plating.

The magnetic characteristics of the thus produced magnetic thin films were measured and the results obtained are given in the following Table 1.

TABLE 1

| Composition of Evaporative Source (wt%) | Produced in Plasma Without Applied Magnetic Field | | | Produced in Plasma due to Applied Magnetic Field | | |
|---|---|---|---|---|---|---|
| | Film Thickness (μm) | Coercive Force (oe) | Squareness Ratio | Film Thickness (μm) | Coercive Force (oe) | Squareness Ratio |
| Co | 0.33 | 240 | 0.60 | 0.35 | 250 | 0.85 |
| Co(75)-Ni(25) | 0.29 | 300 | 0.61 | 0.34 | 280 | 0.82 |
| Co(50)-Ni(50) | 0.34 | 230 | 0.58 | 0.31 | 250 | 0.83 |
| Co(90)-Cu(10) | 0.25 | 210 | 0.63 | 0.30 | 240 | 0.83 |

invention are nitrogen gas and noble gases such as helium, neon, argon, krypton, xenon and radon. These can be used alone or as a mixture thereof, if desired.

According to the method of this invention, it is possible to form an even magnetic thin film having good adhesion to the substrate thereof by ionic-plating, and further, it is possible to form a magnetic thin film having a markedly higher B—H curve squareness ratio than that of magnetic films prepared by conventional methods. In high density recording with magnetic recording media, the self-demagnetization loss increases as the wavelengths being recorded decrease, and therefore, a higher squareness ratio is required for the magnetic recording medium. According to the method of the present invention, it is easy to produce improved magnetic recording media with these preferred magnetic characteristics. In addition, according to the present method a magnetic thin film having better surface characteristics and metallic brilliance than those of magnetic films produced by conventional ionic-plating methods can be obtained.

The present invention is explained in greater detail by reference to the following Examples, which, however, are not intended to be interpreted as limiting the scope of the present invention.

EXAMPLE 1

For formation of a ferromagnetic metal thin film the ionic-plating apparatus as described in U.S. Pat. No. 3,329,601 was used, and films of Co, Co—Ni and Co—Cu were formed on a polyethylene terephthalate support. A permanent magnet (length: 15 cm) was used as a cathode, and the polyethylene terephthalate The samples produced in the plasma have uniform magnetic characteristics as determined in every direction on the surface of the formed thin film thereof, and these samples have a much higher squareness ratio than those produced by the conventional method. In addition, it also is noted that the surface of the thin film formed in the plasma generated due to the applied magnetic field had good surface characteristics and remarkable metallic brilliance.

EXAMPLE 2

Analogously to Example 1, a permanent magnet (length: 20 cm) was used as a cathode, and a polyimide support (width: 2 inches) was applied in the regions of a N-pole and S-pole and the central region between the N-pole and the S-pole of this magnet, and Co, Co—Fe and Co—Fe—Cr were plated thereon by ionic-plating.

The strength of the magnetic field in the regions of the N-pole and the S-pole was 700 oe and that in the central region therebetween was 600 oe. After the degree of vacuum was adjusted to $10^{-6}$ Torr, helium gas was introduced to change the degree of vacuum to 0.01 Torr. Thus, ionic-plating was carried out for 4 minutes where the acceleration voltage was 1.0 kv. The surface of the substrate was not pre-cleaned prior to the ionic-plating. It is noticed that plasma generated due to the glow discharge was concentrated in the central region of the magnet during the ionic-plating, and no luminosity of plasma was observed in the regions of the N-pole and the S-pole.

Magnetic characteristics of the thus produced magnetic thin films were measured and the results obtained are given in the following Table 2.

TABLE 2

| Composition of Evaporative Source (wt%) | Formed in the N-pole Region Film Thickness (μm) | Coercive Force (oe) | Squareness Ratio | Formed in the Central Region of the N-pole and the S-pole Film Thickness (μm) | Coercive Force (oe) | Squareness Ratio |
|---|---|---|---|---|---|---|
| Co | 0.20 | 330 | 0.61 | 0.19 | 350 | 0.84 |
| Co(80)-Fe(20) | 0.18 | 290 | 0.59 | 0.19 | 300 | 0.80 |
| Co(75)-Fe(20)-Cr(5) | 0.21 | 320 | 0.60 | 0.20 | 300 | 0.82 |

The magnetic characteristics of the samples produced in the S-pole were almost the same as those produced in the N-pole.

The samples produced in the central region with the concentrated plasma have a uniform squareness ratio in every direction in the surface of the thin films formed, and induction of uniaxial anisotropy was not observed therein. In addition, the samples produced in the region of the concentrated plasma exhibited a much higher squareness ratio than those produced in the region of the N-pole and the S-pole.

EXAMPLE 3

Analogously to Example 1, the same ionic-plating apparatus was used and films of Fe, Fe—Ni—Co, Co and Fe—Rh were formed on a polyimide support. Argon was used for the glow discharge, and after surface cleaning was carried out for 2 minutes under a degree of vacuum of 0.01 Torr and a voltage of 2 kv, the subsequent ionic-plating was carried out for 4 minutes under a degree of vacuum of 0.04 Torr and a voltage of 1.5 kv. Next, Helmholtz coils for generation of a magnetic field were set so that the substrate holder containing the polyimide was positioned intermediate between the two coils. The strength of the magnetic field on the surface of the support was adjusted to 160 oe and ionic-plating was carried out analogously to the above, whereby the plasma was observed to be concentrated in the vicinity of the surface of the support.

TABLE 3

| Composition of Evaporative Source (wt%) | Without Applying Magnetic Field Film Thickness (μm) | Coercive Force (oe) | Squareness Ratio | With Applying Magnetic Field Film Thickness (μm) | Coercive Force (oe) | Squareness Ratio |
|---|---|---|---|---|---|---|
| Fe | 0.22 | 180 | 0.47 | 0.25 | 210 | 0.73 |
| Fe(40)-Ni(20)-Co(40) | 0.31 | 310 | 0.53 | 0.30 | 300 | 0.72 |
| Co | 0.32 | 320 | 0.58 | 0.35 | 310 | 0.75 |
| Fe(97)-Rh(3) | 0.28 | 210 | 0.51 | 0.27 | 210 | 0.72 |

Induction of uniaxial anisotropy was not observed in the above samples produced in the magnetic field, and these samples were observed to have an improved higher squareness ratio than the other samples produced without the magnetic field.

In addition, the surface of the thin film formed in the plasma generated due to the applied magnetic field was observed to have an excellent metallic brilliance and observation with a scanning type electron microscope confirmed that the surface of the thin film was even.

In the above Examples polyethylene terephthalate and polyimide were used as the substrate. Other plastic supports such as polyvinyl chloride, cellulose triacetate and polycarbonate as well as metals such as aluminum and brass can also be used therefor. The substrate can be in the form of a tape, a sheet, a card, a disk or a drum, on which an even magnetic thin film can be formed.

While the invention has been described in detail and with reference to specific embodiments thereof, it will be apparent to one skilled in the art that various changes and modifications can be made therein without departing from the spirit and scope thereof.

What is claimed is:

1. A method for producing a magnetic recording medium by ionic-plating having generally uniform magnetic characteristics in every direction comprising generating in a vacuum chamber and in a magnetic field a plasma of the glow discharge of a gas between a negatively-charged magnetic recording medium substrate and a positively-charged evaporative source of a ferromagnetic material and positioning the substrate in a magnetically concentrated zone of the plasma which is concentrated by the magnetic field, whereby the ferromagnetic material is evaporated and deposited on the magnetic recording medium substrate.

2. The method as claimed in claim 1, wherein the magnetic field has a strength ranging from about 50 to 5000 oe.

3. The method as claimed in claim 1, wherein the voltage of the glow discharge is about 0.1 to 5.0 kv.

4. The method as claimed in claim 1, wherein the degree of vacuum is about 0.001 to 0.1 Torr.

5. The method as claimed in claim 1, wherein the ionic-plating is conducted for about 0.5 to 20 minutes.

6. The method as claimed in claim 1, wherein the gas is chosen from at least one of the group consisting of nitrogen gas and a noble gas.

7. The method as claimed in claim 6, wherein said gas is chosen from at least one of the group consisting of helium, neon, argon, krypton, xenon and radon.

8. The method as claimed in claim 1, wherein the ionic-plating is continued until the thickness of the ferromagnetic thin film ranges from about 0.05 to 1.0 μm.

9. The method as claimed in claim 1, wherein the magnetic material is at least one ferromagnetic substance selected from the group consisting of Fe, Co, Ni, Fe—Co, Fe—Ni, Co—Ni, Fe—Rh, Fe—Cu, Fe—Au, Co—Cu, Co—Au, Co—Y, Co—La, Co—Pr, Co—Gd, Co—Sm, Co—Pt, Ni—Cu, Fe—Co—Ni, Mn—Bi, Mn—Sb, Mn—Al, Ba—ferrite and Sr—ferrite.

10. The method as claimed in claim 1, wherein the magnetic recording medium substrate is wound around a permanent magnet in the central region between the N-pole and S-pole, said permanent magnet acting as a cathode.

* * * * *